United States Patent [19]

Momose

[11] 3,757,915

[45] Sept. 11, 1973

[54] PRESSURE CONTROLS FOR INCHING CLUTCHES

[75] Inventor: Yutaka Momose, Toyota, Japan

[73] Assignee: Aisin Seiki Kabushiki Kaisha, Aichi Pref., Japan

[22] Filed: Oct. 29, 1971

[21] Appl. No.: 193,666

[30] Foreign Application Priority Data
Oct. 29, 1970 Japan.............................. 45/095454

[52] U.S. Cl............ 192/87.19, 192/4 A, 192/109 F, 137/505.15, 137/596.12, 137/596.18, 137/625.27
[51] Int. Cl........................ F16d 67/04, F16d 25/10
[58] Field of Search................... 192/109 F, 87.18, 192/87.19, 13 R, 4 A, 4 C, 85 R

[56] References Cited
UNITED STATES PATENTS

| 3,640,360 | 2/1972 | Dollase............................ 192/109 F |
| 3,339,672 | 9/1967 | Crandall......................... 192/13 R X |
| 2,941,639 | 6/1960 | Christenson et al. ............. 192/13 R |
| 2,935,999 | 5/1960 | Hock et al....................... 192/109 F |
| 3,583,422 | 6/1971 | Dach.............................. 192/109 F |

Primary Examiner—Benjamin W. Wyche
Attorney—Norman F. Oblon et al.

[57] ABSTRACT

A transmission control system for a vehicle having fluid actuated frictional clutch means, comprising a source of pressurized fluid, a first fluid conduit connecting the source to the frictional clutch means, a regulator valve assembly disposed within the first conduit for controlling fluid pressure discharged from the source for the clutch means, an inching valve means disposed within the first conduit being mechanically connected to a manually operable pedal, and a second normally closed fluid conduit for on-off controlling by the inching valve means, the second conduit being adapted for conveying fluid pressure supplied from the source to the regulator valve assembly for rapidly lowering the controlled fluid pressure, whereby when the second conduit is opened by depressing of the pedal, the controlled fluid pressure is lowered rapidly, and then the lowered fluid pressure is gradually regulated by the movement of the inching valve means corresponding to the degree of the depression of the pedal.

12 Claims, 2 Drawing Figures

Patented Sept. 11, 1973  3,757,915
FIG. 1
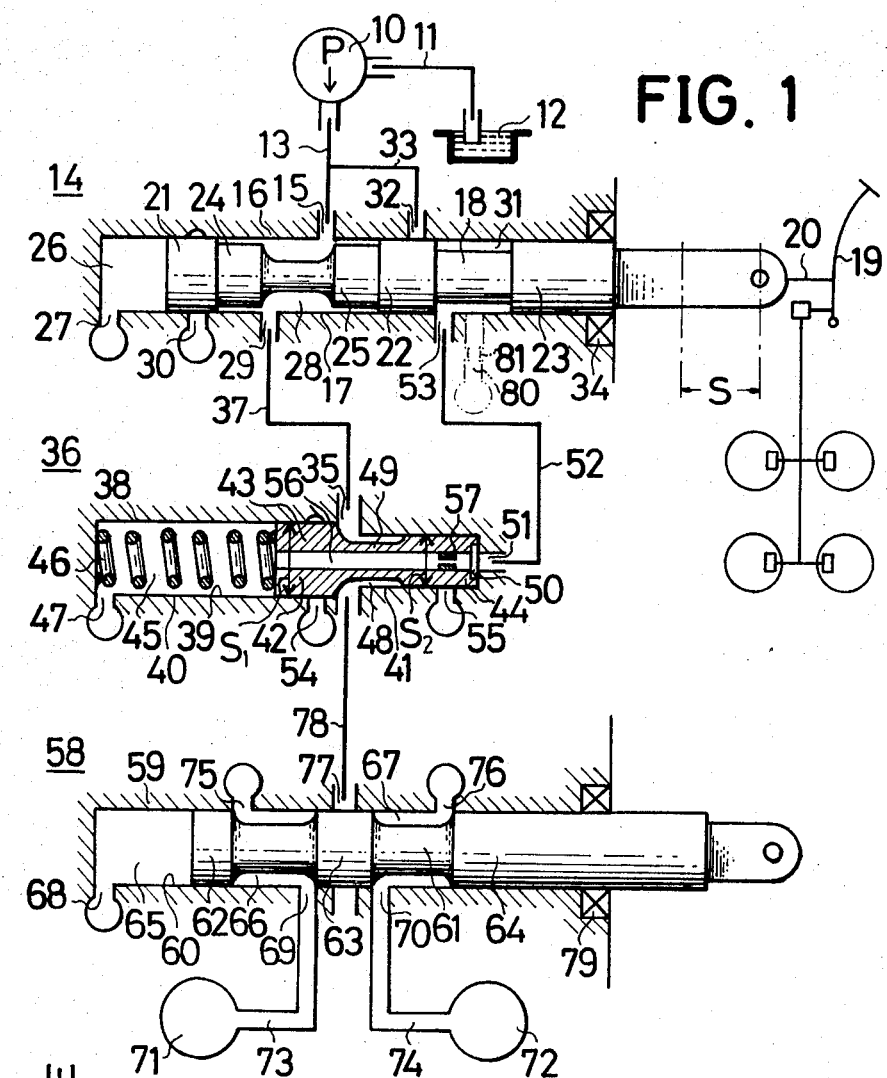
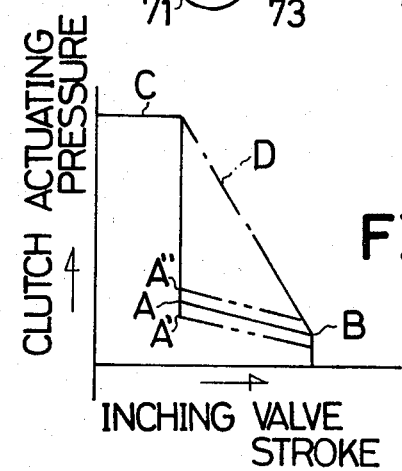
FIG. 2
INVENTOR.
YUTAKA MOMOSE
BY
Oblon, Fisher and Spivak

PRESSURE CONTROLS FOR INCHING CLUTCHES

BACKGROUND OF THE INVENTION

This invention relates generally to a transmission control system, and more particularly to a fluid control system for a vehicle having fluid actuated clutch means.

It is frequently required that an industrial vehicle, such as a fork-lift truck, be able to carry out its lifting operation even when the prime engine of the vehicle is in its fully throttled position in which case a hydraulic pressure pump mechanically connected to the engine through a crankshaft is in its maximum loaded condition. In addition, during such lifting operations, the vehicle must be able to move forward and rearward, especially to accomplish an "inching" operation smoothly and efficiently.

In order to satisfy the above-mentioned requirements, control systems have heretofore been proposed for gradually lowering fluid under pressure being conveyed to a hydraulic chamber of a clutch actuator in response to the movement of an inching valve means. However, the fluid pressure grade obtained by these systems is steep, as shown at D in FIG. 2 of the accompanying drawings, and therefore it is difficult to provide semi-engaged clutch operation because each clutch operation can be obtained only in a very narrow range of the stroke of the inching valve means in response to a manually operable pedal. This drawback requires skillful manipulation of the pedal in order to accomplish the desired inching operation of the vehicle.

SUMMARY OF THE INVENTION

Therefore, it is an object of the present invention to provide an improved transmission control system adapted for obviating the aforementioned conventional drawbacks.

It is another object of the present invention to provide an improved transmission control system wherein the semi-engaged clutch operation can be more easily realized than the conventional systems.

It is a further object of the present invention to provide an improved transmission control system wherein fluid pressure discharged from the pump and controlled by a regulator valve assembly is lowered rapidly to a point at which the controlled fluid pressure is slightly higher than the fluid pressure required to engage a clutch means when an inching pedal is depressed, and then the fluid pressure so lowered is gradually regulated in response to the degree of pedal depression.

It is a still further object of the present invention to provide an improved transmission control system wherein the controlled pressure is lowered rapidly into a hydraulic pressure of a value controlled and varied in response to the revolution rate of the engine of the vehicle.

It is a further object of the present invention to provide an improved transmission control system wherein fluid under pressure for lubrication and cooling the clutch plates of a clutch means is regulated by a regulator valve assembly when the clutch actuating-fluid pressure supplied to the clutch means is interrupted.

BRIEF DESCRIPTION OF THE DRAWINGS

These and further objects, features and attendant advantages of the present invention will be more fully appreciated as the same becomes better understood from the following detailed description when considered in connection with the accompanying drawing wherein:

FIG. 1 is a diagrammatic view, with parts in vertical cross-section, of one embodiment of the fluid control system according to the present invention, and FIG. 2 is a graph diagrammatically representing the clutch actuating hydraulic pressure characteristics of the system of the present invention in comparison with conventional systems.

DETAILED DESCRIPTION OF THE INVENTION

Referring now to the drawing, the numeral 10 designates a hydraulic pressure pump driven by a prime engine, not shown, of a vehicle. The pump 10 is fluidically connected on one side through a suction piping 11 of a reservoir 12 and is fluidically connected on an outlet side through a delivery conduit or duct 13 to an inching valve means generally designated by the reference numeral 14, and therefore, fluid under pressure may be conveyed by the pump 10 from the reservoir 12 to the inching valve means 14, and more particularly to an inlet port 15 thereof, when the pump 10 is operated.

The inching valve means 14 comprises a housing 16 having an axial bore 17 therein in which a spool valve 18 is axially slidably mounted being mechanically connected at its one end to a brake pedal or an inching pedal 19 through a push rod 20 so as to be slidable within the stroke range S shown in FIG. 1 in response to the degree fo depression of the pedal 19. The spool valve 18 is provided with lands 21, 22 and 23 of substantially the same diameter as the bore 17 and which are slidably fitted in the bore 17, and smaller diameter lands 24 and 25 disposed between lands 21 and 22, which will serve, respectively, as orifices with respect to the inside wall of the housing 16. The bore 17 is formed with a drain chamber 26 between the land 21 and the left end wall of the housing 16 which is provided in turn with a drain port 27. A hydraulic pressure chamber 28 is formed between the lands 21 and 22 and is connected to the inlet port 15 when the spool valve 18 is in its rest position, but always is kept in fluid communication with an outlet port 29 provided within the housing 16. A drain port 30 is normally closed by the land 21 of the spool valve 18. An inlet port 32 leading from a branched duct 33 of the duct 13 to further chamber 31 between the lands 22 and 23 is normally closed by the land 22, but is connected to the chamber 31 upon leftward movement of the spool valve 18. An annular sealing member 34 is disposed around the land 23 of the spool valve 18 for the prevention of hydraulic pressure leakage.

Fluid under pressure admitted to the chamber 28 by the pump 10 is introduced to an inlet port 35 of a regulator valve assembly generally designated by the reference numeral 36 via a conduit or duct 37 fluidically connected to the outlet port 29 of the inching valve means 14. The regulator valve assembly 36 comprises a main body 38 having a stepped valve bore 39 formed therein which includes a large diameter bore 40 and a small diameter bore 41 arranged coaxially with each other. A stepped spool valve 42 having a large diameter portion 43 of cross-sectional area $S_1$ movably fitted in the bore 40 and a small diameter portion 44 of cross-sectional area $S_2$ movably fitted in the bore 41 is disposed in the valve bore 39. A drain chamber 45 is formed between the left end wall of the large diameter portion 43 of the valve 42 and the inside wall of the body 38 and a spring means 46 urging the valve 42 in rightward direction as viewed in FIG. 1 is interposed within the drain chamber 45. The drain chamber 45 is always connected to a drain port 47. An annular groove chamber 48 is formed around an intermediate most reduced diameter portion 49 of the valve 42 and is normally open to the inlet port 35 of the body 38. A chamber 50 is provided between the right edge of the small diameter portion 44 and the body 38 and is connected to a port 51 in the body 38, and thence via a conduit or duct 52 to an outlet port 53 of the inching valve means 14 which always is in fluid communication with the chamber 31. With the stepped spool valve 42 being urged by the spring 46 in the right direction, as viewed in FIG. 1, drain ports 54 and 55 formed on the body 38 are normally closed, respectively, by the large diameter portion 43 and the small diameter portion 44 of the valve 42. The stepped spool valve 42 is provided with an axial hydraulic passage 56 for establishing fluid communication between the chambers 45 and 50. The passage 56 is provided with a small orifice 57 for reducing the quantity of the pressure fluid passing from the chamber 50 to the chamber 45.

The numeral 58 generally designates a shift control valve unit mechanically connected to a shift lever, not shown. The unit 58 comprises a housing 59 having a bore 60 formed therein in which a spool valve 61 is axially slidably fitted. Lands 62, 63 and 64 are provided on the spool valve 61 for forming chambers 65, 66 and 67 within the bore 60. The chamber 65 between the left end wall of land 62 and the inside wall of housing 58 is always in communication with a drain port 68. When the spool valve 61 is kept in its neutral position, as shown in FIG. 1, drain ports 69 and 70 are connected, respectively, to a forward and a reverse clutch means 71 and 72 through conduits or ducts 73 and 74 which, respectively, are connected with the chambers 66 and 67. At this same time, drain ports 75 and 76 in the housing 59 are also connected, respectively, with the chambers 66 and 67. An inlet port 77 is supplied with the modulating output pressure from the regulator valve assembly 36 via a conduit or duct 78, which is closed by the land 63 in the neutral position of the valve 61 shown in FIG. 1. A sealing member 79 at the open end of bore 60 in housing 59 is adapted to prevent hydraulic pressure leakage therefrom.

All of the drain ports in this transmission control system are always connected to the reservoir 12 or another tank, which is, however, omitted from the drawing for the purpose of simplicity.

In operation, in the neutral state of the spool valve 61 of the shift control valve unit 58 as shown in FIG. 1, when operation of the engine, not shown, of the vehicle is begun, the pump 10 discharges pressure fluid into the chamber 28 via the duct 13 and then into the annular groove chamber 48 of the regulator valve assembly 36 via the conduit 37. When the force of the fluid under pressure being applied to an area equal to the difference between the cross-sectional areas $S_1$ and $S_2$ of the spool valve 42 overcomes the biasing force of spring 46 normally urging the spool valve 42 toward the right, the valve 42 is moved leftward to fluidically communicate the drain port 54 with the chamber 48. Thus, the hydraulic pressure delivered to the port 77 of the control valve unit 58 through duct 78 is controlled at a high value, as shown in FIG. 2 at C. Under this condition, upon movement of the spool valve 61 toward the right, as viewed in FIG. 1, the port 77 is fluidically connected to the port 69 via the chamber 66 while the fluid communication between the drain port 75 and the chamber 66 is interrupted by the land 62, and therefore, the high hydraulic pressure being shown at C is admitted to the forward clutch 71, whereby forward drive of the vehicle is permitted. Upon the movement of the valve 61 in the left direction, the high pressure, as shown at C, is supplied to the reverse clutch 72 since the drain port 76 is then closed by the land 64 and the port 70 is fluidically connected to the port 77, so that reverse drive of the vehicle is attained.

When the pedal 19 is depressed, the spool valve 18 is slidably moved in the left direction. Therefore, at first the normally closed inlet port 32 is opened to the chamber 31 so that fluid under pressure is delivered from the pump 10 to the chamber 50 of the regulator valve assembly 36 through the ducts 13, 33 and 52, whereby the spool valve 42 is moved in the leftward direction. In this stage, the fluid pressure in the annular groove chamber 48 is lowered rapidly to a low value, as shown at A in FIG. 2, because the spool valve 42 is now urged to move to the left by the fluid under pressure which acts both on an area equal to the difference of the cross-sectional areas $S_1$ and $S_2$ and on the cross-sectional area $S_2$, whereby drain 54 is opened to chamber 48. In addition, the fluid pressure conveyed to the chamber 50 is drained out through the axial passage 56 provided with the orifice 57, and thus through the drain chamber 45 and the drain port 47. This fluid pressure flow is throttled by the orifice 57. Therefore, when the engine of the vehicle runs at a low velocity revolution wherein the pump 10 discharges a small quantity of fluid pressure to the chamber 50, the fluid pressure in the annular groove chamber 48 is lowered rapidly to a relatively high value, as shown in FIG. 2 at A''. When the engine of the vehicle runs at high velocity so that the pump 10 discharges a large quantity of fluid pressure the fluid pressure in the annular groove chamber 48 is lowered rapidly to an even lower value as shown in FIG. 2 at A. As mentioned above, the point A is controlled in response to the rate of the engine revolution to satisfy the effective torque demand upon engagement of the clutch means, whereby it will be capable of attaining the semi-engaged clutch operation in the preferable manner. When the spool valve 18 is moved further to the left, drain port 30 is opened to the pressure chamber 28 so that fluid pressure in the chamber 28 is gradually drained out through the orifice formed by the land 24 while the fluid pressure flow from the duct 13 to the chamber 28 is controlled by the orifice formed by the land 25. In this way, the fluid pressure supplied to the forward or the reverse clutch means will be gradually throttled, as shown at the line connecting the points A-B in FIG. 2, and therefore, it will be capable of obtaining the semi-engaged clutch operation easily because of increasing the semi-engaged clutch range.

When the spool valve 18 is further moved in the leftward direction to close the inlet port 15 by the land 22, the fluid pressure supplied to the clutch means is drained out wholly via the drain port 30. Under this condition, fluid pressure delivered by the pump 10 is conveyed to the chamber 50 through the ducts 13, 33, inlet 32, chamber 31 and the conduit 52, thereby urging the small diameter portion 44 to move the spool valve 42 in the left direction as seen in FIG. 1. Thus the drain port 55 is opened to the chamber 50 and the fluid pressure in the chamber 50 is now regulated at the fluid pressure value set by the spring 46 and the cross-sectional area $S_2$ of the small diameter portion 44. This regulated pressure may be applied to the clutch assembly to lubricate and cool its clutch plates.

A drain port 80, as shown by dash-dot lines in FIG. 1, is also contemplated, being connected to the chamber 31 and having an orifice 81 in place of the passage 56 provided with the orifice 57.

Various other modifications and variations of the present invention are obviously possible in light of the above teachings. It is to be understood, therefore, that within the scope of the appended claims, the invention may be practiced otherwise than as specifically described herein.

What is claimed as new and desired to be secured by Letters Patent of the United States is:

1. A transmission control system for a vehicle having fluid actuated frictional engaging means, said system comprising:
   a fluid pressure generating source;
   a first fluid conduit means for connecting said source to said frictional engaging means;
   a regulator valve assembly connected with said first conduit means for controlling automatically fluid pressure supplied from said source and for delivering the controlled fluid pressure to said frictional engaging means;
   said regulator valve assembly including a first stepped spool valve slidably fitted in a housing for defining a first, a second and a third chambers with a spring means interposed in said first chamber for urging said spool valve in one direction, said second chamber constantly being in fluid communication with said first fluid conduit means;
   a second fluid conduit means for conveying fluid pressure from said source to said third chamber for urging said spool valve to move against said spring means; and
   an inching valve means provided in said first and second conduit means and including a housing and a second spool valve slidably fitted therein and being operatively connected to a manually operable pedal, said second spool valve comprising a first land for opening said second conduit means upon depression of said pedal and flow restricting means for controlling fluid pressure to be supplied to said frictional engaging means in response to the sliding movement of said second valve of said inching valve means, whereby said controlled fluid pressure is rapidly lowered, and said lowered fluid pressure is gradually regulated in response to the degree of depression of said pedal.

2. A transmission control system as set forth in claim 1, wherein said frictional engaging means comprises:
   a forward and a reverse fluid actuated clutch means; and
   a shift control valve unit being connected with said first fluid conduit means for selectively controlling a pair of fluid conduits connecting an outlet port of said regulator valve assembly, respectively, to said forward and reverse clutch means.

3. A transmission control system as set forth in claim 1, wherein said regulator valve assembly comprises a drain port provided in the housing, said drain port being normally closed by a land of said first stepped spool valve and being opened to communicate with said second chamber thereof according to the sliding movement of said first stepped spool valve when a predetermined pressure is applied to said third chamber.

4. A transmission control system as set forth in claim 1, wherein said housing of the inching valve means further comprises a drain port normally closed by a second land of said second spool valve.

5. A transmission control system as set forth in claim 4, wherein said flow restricting means comprises two smaller diameter lands connected to each other, one of said lands being for throttling the fluid pressure to be supplied from said source in response to the slidable movement of said second spool valve of said inching valve means, and the other land being for throttling the fluid pressure to be drained through said drain port normally closed by said second land in response to the movement of said second spool valve.

6. A transmission control system for a vehicle having fluid actuated frictional engaging means, said system comprising:
   a fluid pressure generating source adapted for providing pressurized fluid of an amount in proportion to the revolution rate of an engine of the vehicle;
   a first fluid conduit means for connecting said source to said frictional engaging means;
   a regulator valve assembly connected with said first conduit means for controlling automatically fluid pressure supplied from said source and for delivering the controlled fluid pressure to said frictional engaging means;
   said regulator valve assembly including a stepped spool valve slidably fitted in a housing for defining a first, a second and a third chambers with a spring means interposed in said first chamber for urging said spool valve in one direction, said second chamber constantly being in fluid communication with said first fluid conduit means;
   a second fluid conduit means for conveying fluid pressure from said source to said third chamber for urging said spool valve to move against said spring means;
   said fluid pressure being conveyed to said third chamber being constantly drained through an orifice in said spool valve; and
   an inching valve means provided in said first and second conduit means and being cooperatively connected to a manually operable pedal for opening said second conduit means upon depression of said pedal, whereby said controlled fluid pressure is rapidly lowered, and for then gradually regulating said lowered fluid pressure in response to the degree of depression of said pedal.

7. A transmission control system as set forth in claim 6, wherein said spool valve is formed with a passage in which is provided said orifice for fluidically connecting said first chamber to said third chamber, said first chamber being always open to a drain port.

8. A transmission control system for a vehicle having fluid actuated frictional engaging means, said system comprising:
   a fluid pressure generating source;
   a first fluid conduit means for connecting said source to said frictional engaging means;
   a regulator valve assembly connected with said first conduit means for controlling automatically fluid pressure supplied from said source and for delivering the controlled fluid pressure to said frictional engaging means;

said regulator valve assembly including a stepped spool valve slidably fitted in a housing for defining a first, a second and a third chambers with a spring means interposed in said first chamber for urging said spool valve in one direction, said second chamber constantly being in fluid communication with said first fluid conduit means;

a second fluid conduit means for conveying fluid pressure from said source to said third chamber for urging said spool valve to move against said spring means; and an inching valve means provided in said first and second conduit means and being cooperatively connected to a manually operable pedal for opening said second conduit means upon depression of said pedal, whereby said controlled fluid pressure is rapidly lowered, and for then gradually regulating said lowered fluid pressure in response to the degree of depression of said pedal, wherein said inching valve means comprises:

a housing having a bore formed therein and an inside end wall;

a spool valve slidably mounted in said bore and having first, second and third lands thereon and first and second smaller diameter lands thereon, said first and second smaller diameter lands being adapted for forming a first and second orifices, respectively, with respect to the inside wall of the housing;

a first drain chamber formed between the first land and the inside end wall of said housing;

a second hydraulic chamber formed between the first and second lands being normally interconnected to said first conduit means;

a drain port normally closed by said first land; and a third chamber provided between said second and third lands being normally interrupted from said second conduit means by said second land, whereby when the spool valve of said inching valve means is moved by said pedal said second conduit means is opened for establishing fluid communication between said source and said third chamber of said regulator valve assembly, and when the spool valve is further moved fluid under pressure conveyed to said second chamber of said inching valve means is throttled by said second orifice while at the same time said second chamber of said inching valve means is connected to said drain port of said inching valve means via said first orifice.

9. A transmission control system as set forth in claim 8, wherein a further drain port is formed on the housing of the inching valve means being always connected to said third chamber of said inching valve and further orifice is provided in said further drain port.

10. A transmission control system as set forth in claim 8, wherein said regulator valve assembly further comprises a normally closed drain port cooperable with a small diameter portion of said stepped spool valve for regulating fluid under pressure supplied to said third chamber of said regulator valve assembly when said first conduit means is interrupted by said inching valve means.

11. A transmission control system for a vehicle having fluid actuated frictional engaging means, said system comprising:

a fluid pressure generating source;

an inching valve having a first inlet connected to said pressure source normally being open to a first outlet and a second inlet connected to said pressure source normally being closed to a second outlet;

a regulator valve assembly having a stepped spool valve slidably fitted in a housing for defining first, second and third chambers with a spring means interposed in said first chamber for urging said spool valve in one direction;

means fluidically connecting said second chamber of said regulator valve with said first outlet of said inching valve;

means fluidically connecting said third chamber of said regulator valve with said second outlet of said inching valve;

means fluidically connecting said second chamber of said regulator valve with said frictional engaging means;

means for selectively fluidically connecting said second inlet of said inching valve to said second outlet and simultaneously restricting the flow between said first inlet and said first outlet, and for selectively closing said first inlet while maintaining the fluidic connection between said second inlet and said second outlet;

means for fluidically connecting said first and third chambers of said regulator valve assembly having flow throttling means therein; and means fluidically connecting said first chamber of said regulator valve assembly with a reservoir.

12. A transmission control system as set forth in claim 11, wherein said frictional engaging means comprises;

a forward and a reverse fluid actuated clutch means; and a shaft control valve unit being connected with said means fluidically connecting said second chamber of said regulator valve with said frictional engaging means for selectively controlling a pair of fluid conduits connected with said forward and reverse clutch means.

* * * * *